Dec. 29, 1964  W. R. MYERS  3,163,418
SIMULATED ANIMAL TARGET FOR ARCHERS
Filed Jan. 18, 1963
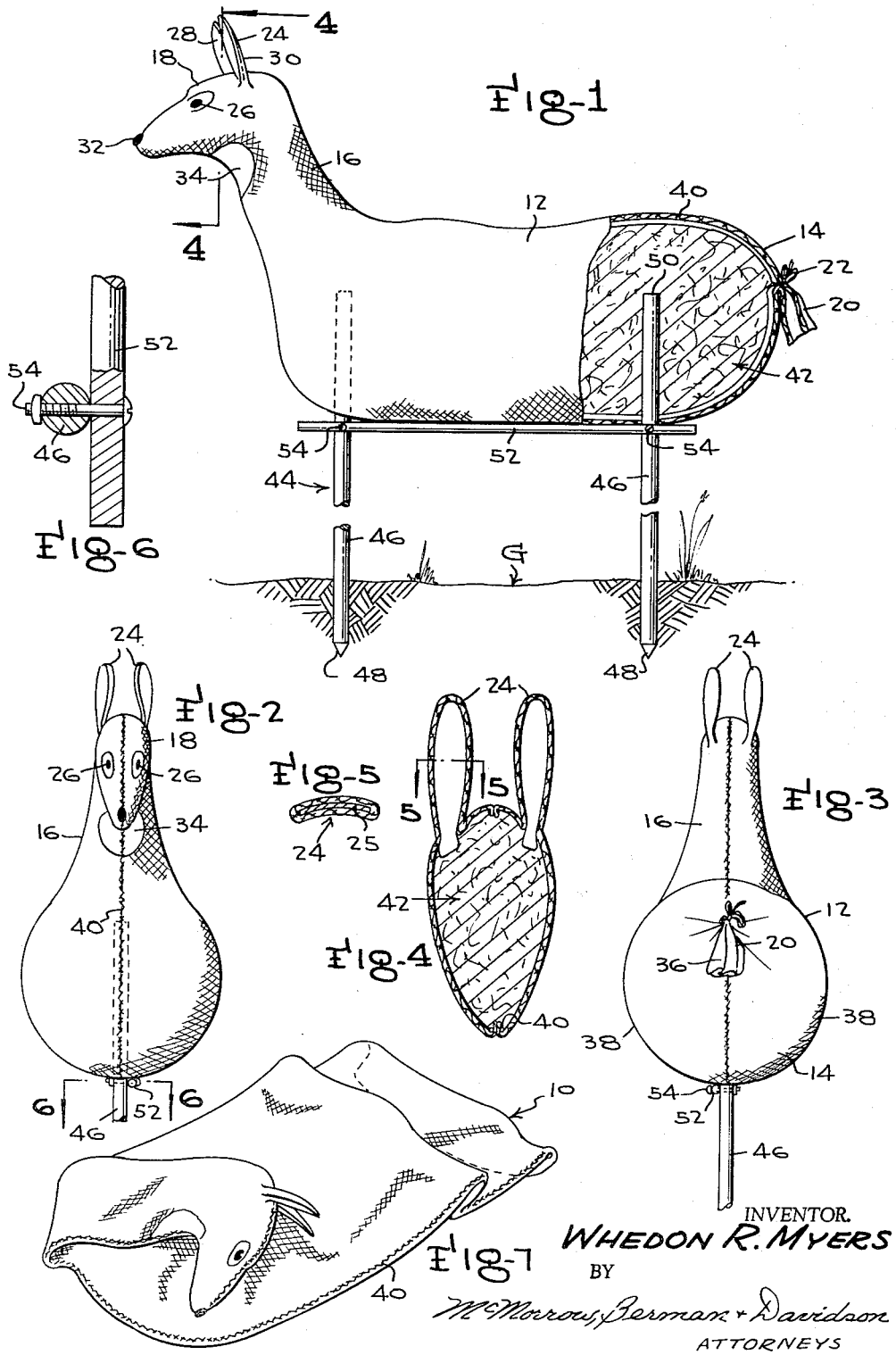
INVENTOR.
WHEDON R. MYERS
BY
McMorrow, Berman & Davidson
ATTORNEYS

3,163,418
SIMULATED ANIMAL TARGET FOR ARCHERS
Whedon Ray Myers, M & G Trailer Court, R.D. 2, York, Pa.
Filed Jan. 18, 1963, Ser. No. 252,421
2 Claims. (Cl. 273—102)

This invention relates to a novel simulated animal target for archers.

The primary object of the invention is the provision of a realistic, readily portable, and relatively inexpensive target of the kind indicated, which enables archers to obtain practice in shooting arrows, from different distances and angles, to the target, aimed to strike vulnerable areas of the animal represented by the target, thereby increasing their skill and accuracy for actual live hunting.

Another object of the invention is the provision of a simple target of the character indicated above, which is composed of a small number of uncomplex and easily assembled components, which can be, if desired, assembled at the target area, and can be carried, as in a car trunk compartment, in compact, unassembled condition.

Other important objects and advantageous features of the invention will be apparent from the following description and the accompanying drawings, wherein, for purposes of illustration only, a specific form of the invention is set forth in detail.

In the drawings:

FIGURE 1 is a contracted schematic side elevation, partly broken away and in section, showing a target, in accordance with the present invention, in the form of a deer, set up for target practice;

FIGURE 2 is a fragmentary front end elevation of FIGURE 1;

FIGURE 3 is a fragmentary rear elevation thereof;

FIGURE 4 is an enlarged vertical transverse section taken on the line 4—4 of FIGURE 1;

FIGURE 5 is a further enlarged horizontal section taken on the line 5—5 of FIGURE 4;

FIGURE 6 is a fragmentary and enlarged horizontal section taken on the line 6—6 of FIGURE 2; and, FIGURE 7 is a perspective view of the target envelope in unstuffed and collapsed condition.

Referring in detail to the drawings, wherein like numerals designate like parts through the several views, the illustrated deer target comprises a hollow flexible envelope 10 of non-resilient open-work material, such as burlap, which is formed to provide a generally cylindrical body portion 12, terminating, at its rear end, in a rounded rump portion 14, and terminating, at its forward end, in an upwardly and forwardly angled nook 16 having a head 18, on its upper end.

The rump portion 14 is formed with a filling opening, preferably in the form of a tubular extension 20, which when tied closed, next to the rump portion, as indicated at 22, constitutes the animal target's tail.

The head 18 is hollow and of the same material as the neck 16 and the body portion 12, and is formed to provide two hollow, laterally spaced upstanding concavo-convex ears 24, and properly located eyes 26. The fronts of the ears 24 are concave and are pointed while, as indicated at 28, and the convex rear sides thereof black, as indicated at 30, for realism. A nose 32 is provided on the forward end of the head 18. White markings 34 are painted white on the front of the neck 16, below the head 18, and on the tail 20, as indicated at 36, to further simulate a live deer. The ears are given adequate rigidity by stiff inserts 25.

The envelope 10 is preferably formed of two similar longitudinally divided sections 38, which are sewn together, at their inner edges, preferably with heavy brown thread, with zig-zag stitches 40. The envelope 10 is stuffed with suitable material, such as straw 42, passed thereinto through the opening of the tail 20, after which the tail is tied to close the opening. It will be evident that the envelope 10 can be collapsed and folded into a compact package for storage and transportation, and that the envelope is adapted to be sold without the stuffing, which stuffing may be readily available in some localities. The resultant is an animal body which is readily penetrable with arrows and from which arrows can be removed without damage thereto.

The stuffed envelope 10 is adapted to be supported on a collapsible H-shaped frame 44 which comprises two spaced parallel uprights 46, having pointed lower ends 48, and blunt upper ends 50, and a single cross member 52. The upper ends of the uprights are forced upwardly through the burlap into the bottom of the body portion 12, at locations corresponding to the locations of the front and rear legs of a live deer, the cross member 52 being secured to one side of the uprights, as by means of bolts 54, at such elevations on the uprights that the underside of the body portion 12 rests supportably upon the cross member 52. The uprights 46 extend sufficiently far below the cross member 52, that, when the lower ends thereof are forced into the ground G, to an ample depth, such as four to six inches, the body portion 12 will be spaced above the ground, at a normal height for a deer of the size of the target deer. The frame 44 is readily collapsed for compact storage and transportation, when removed from the body portion 12, by loosening the bolts 54, and separating the cross member 52 from the uprights 46.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A simulated animal archery target comprising a flexible hollow envelope of open-work fabric material, a mass of comminuted material stuffed into the envelope and shaping the same to the contour of an animal, and a ground-supported frame secured to the envelope and spacing the same above the ground, said frame comprising a pair of spaced uprights having upper ends inserted upwardly through the material of the envelope into the stuffing and lower ends inserted into the ground, and a cross member extending between and secured to the uprights and supportably engaged with the underside of the stuffed envelope.

2. A simulated animal archery target comprising a hollow envelope of open-work flexible fabric material, a mass of comminuted material stuffed into the envelope, the stuffed envelope having the form of an animal having a body portion terminating at its rear end in a rump portion and terminating at its forward end in a neck surmounted by a head, the material of the envelope in the area of said rump portion having an open tubular extension defining a tail, through which the stuffing material is adapted to be inserted and removed, and means closing off the opening of the extension, and a frame supporting the stuffed envelope above the ground, said frame having a forward upright inserted upwardly into the body portion at the forward end thereof at the location of and representing forward legs, and a rear upright inserted upwardly into the body portion at the rear end thereof and representing rear legs, and a cross bar extending between and secured to the uprights, upon which the body portion rests, the lower ends of the uprights being inserted into the ground.

References Cited by the Examiner

UNITED STATES PATENTS

| | | | |
|---|---|---|---|
| 946,013 | 1/10 | Clarke | 46—158 |
| 1,818,939 | 8/31 | Brading | 273—102 |
| 2,812,947 | 11/57 | Fatzinger et al. | 273—102.4 |

FOREIGN PATENTS 643,556  5/28  France.

DELBERT B. LOWE, *Primary Examiner.*